United States Patent
Krampe et al.

(10) Patent No.: US 9,471,918 B1
(45) Date of Patent: Oct. 18, 2016

(54) METHOD OF ESTABLISHING CREDIT ON A VENDING DEVICE

(75) Inventors: Richard L. Krampe, Winter Park, FL (US); Neal J. Peacock, Orlando, FL (US)

(73) Assignee: Coin Free, LLC, Winter Park, FL (US)

( * ) Notice: Subject to any disclaimer, the term of this patent is extended or adjusted under 35 U.S.C. 154(b) by 1824 days.

(21) Appl. No.: 12/653,741

(22) Filed: Dec. 18, 2009

(51) Int. Cl.
- G06Q 40/00 (2012.01)
- G06Q 20/34 (2012.01)
- G06Q 20/36 (2012.01)

(52) U.S. Cl.
CPC .......... *G06Q 20/355* (2013.01); *G06Q 20/367* (2013.01)

(58) Field of Classification Search
USPC ........................................ 705/39, 72, 12, 52
See application file for complete search history.

(56) References Cited

U.S. PATENT DOCUMENTS

| | | | |
|---|---|---|---|
| 5,991,749 A | 11/1999 | Morrill, Jr. | |
| 6,038,491 A | 3/2000 | McGarry et al. | |
| 6,584,309 B1 | 6/2003 | Whigham | |
| 6,834,271 B1* | 12/2004 | Hodgson et al. | 705/72 |
| 6,970,850 B1* | 11/2005 | Freeny, Jr. | 705/52 |
| 7,039,389 B2 | 5/2006 | Johnson, Jr. | |
| 7,127,236 B2 | 10/2006 | Khan et al. | |
| 7,164,884 B2 | 1/2007 | Defosse et al. | |
| 7,213,742 B1 | 5/2007 | Birch et al. | |
| 7,575,377 B2 | 8/2009 | Fick et al. | |
| 7,577,616 B2 | 8/2009 | Zhu | |
| 7,593,897 B1* | 9/2009 | Kolls | 705/39 |
| 7,640,181 B2* | 12/2009 | McClure et al. | 705/12 |

* cited by examiner

*Primary Examiner* — Narayanswamy Subramanian
*Assistant Examiner* — Irene Kang
(74) *Attorney, Agent, or Firm* — William M. Hobby, III

(57) ABSTRACT

A method and system is provided for establishing credit on an automatic vending machine or vending device. A currency amount or a number of credits is established on a vending device in order to obtain a product, service or access time from a vending device using a cellular telephone, or other personal wireless communication device. The personal wireless communication device activates an applet, which may be downloaded at the site, to establish a link with a vending machine universal wireless interface coupled to the vending machine device controller and also establishes a link with a remote server for authorizing credit for a vending transaction, which allows the vending transaction to take place.

13 Claims, 4 Drawing Sheets

METHOD OF ESTABLISHING CREDIT ON A VENDING DEVICE

FIELD OF THE INVENTION

The present invention relates to establishing credit on an automatic vending machine or vending device or cash register system and especially to establishing a currency amount or a number of credits on a vending device or cash register system in order to obtain a product, service or access time from a vending device using a cellular telephone, or other personal wireless communication device, using an applet placed on the personal wireless communication device that can communicate with a vending universal wireless device placed on the vending device.

BACKGROUND OF THE INVENTION

Automatic vending machines have become commonplace in public places offering consumers a variety of products from soft drinks to DVD rentals. Many of these vending devices vend more than one product or service and sometimes at different prices. Conventional vending devices accept coins, paper currency, credit cards, or debit cards. Vending devices that accept coin or paper currency often fail to accept the coins or currency offered. Such vending devices also require that the consumer have readily available the currency required.

Vending devices that accept credit and debit cards generally require an online or dial-up connection from the vending device to the credit or debit card issuer, merchant bank or to a gateway service offering credit or debit card processing services. Any of these approaches can be used to verify the availability of funds or credit and thereby authorize the completion of the transaction at the vending device. The online or dial-up connection to the vending device must be secure and must generally be a dedicated connection that is available on demand to insure satisfactory transactions in terms of speed and reliability.

Vending machines or devices as referred to herein include copiers; facsimile machines; printers; data ports; laptop print stations; laundry machines; drink, snack, health food and candy vending machines; DVD and other movie media rental machines; cart rentals; personal service access time rentals as in massage tables, massage beds, foot massagers; access time on air/vacuum dispensing machines; access time on pay-per-play games or per game rental on pay-per-play games referred to as a vending device. A personal wireless communication device includes not only cell phones but also a personal digital assistant (PDA), IPOD, IPHONE, Smartphone, laptop computer or other similar personal wireless communication device, which can be used to communicate with a remote server.

In the past there have been attempts to vend products or services without using cash but these have been primarily concerned with the use of credit cards in which the vending machine has a connection to the world wide internet or some other communication to approve the use of the credit card. One prior system as disclosed in the Whigham U.S. Pat. No. 6,584,309 is for a method of authorizing the purchase of a product from an automatic vending machine by means of a consumer's cellular telephone. In this system the consumer uses a cellular phone to request a product from a vending machine by dialing a specified telephone number to connect the consumer's phone to a server operated by a billing agency. The server identifies the product and creates a request for purchase of the product and a transaction record and sends a "vend code" to the consumer's cell phone, which allows the consumer to purchase the product.

Other systems using cellular telephone or wireless communication devices may be seen in the Johnson, Jr. U.S. Pat. No. 7,039,389, for a cellular telephone-based retail transaction system for dispensing fuel and in the Carapelli U.S. Pat. No. 7,574,377, for a vending system for vending to purchasers having cellular phones or the like enabled to a wireless internet connection for communication over the internet. The Zhu U.S. Pat. No. 7,577,616, provides for a method for secure authentication or electrical payment utilizing a random ID verification method through a mobile communication tool. The Defosse et al. U.S. Pat. No. 7,164,884 uses a wireless interface module to interface with a vending machine control system to allow communication between vending machines and a wireless network by coupling a transceiver to the wireless interface module. The Khan et al U.S. Pat. No. 7,127,236 is for a micropayment financial transaction process utilizing wireless network processing while the McGarry et al. U.S. Pat. No. 6,038,491, is for a monitoring and reporting system using a cellular carrier.

Other prior U.S. Patents include the Morrill, Jr. U.S. Pat. No. 5,991,749 for a wireless telephoney for collecting tolls, conducting financial transactions, and authorizing other activities and the Birch et al. U.S. Pat. No. 7,213,742 for a fuel dispensing system having a plurality of fuel dispensers capable of conducting a fueling transaction using a customer's cellular telephone.

The present invention relates to a Vending Universal Wireless Interface (VUWI) which includes Bluetooth, Wi-Fi, Wireless LAN or other RF Transceiver with outputs that can be connected to a vending device's controller. A vending Devices controller or Vending Machine Controller (VMC) may support one or more cabling or software protocols including a Multi-Drop Data Bus (MDB), a Pulse Interface or a serial interface to a general microprocessor used to control a vending device. The VUWI contains a power supply, a microprocessor, an RF Transceiver using either Bluetooth, Wi-Fi, Wireless LAN or other RF Transceiver protocols, physical connector outputs that can be connected to a vending device's controller (VMC) and a USB interface. Optionally the VUWI can also contain a vending machine interface to accept DEX data from the vending machine's controller.

SUMMARY OF THE INVENTION

A method of establishing credit on a vending device by a consumer using a cellular phone or other wireless personal communication device by a consumer includes establishing and activating an applet on the cellular telephone to establish a wireless link with a vending device having a vending universal wireless device. A wireless link is then established between the wireless personal communication device and a computer server for transmitting a request from the wireless communication device to the computer server for credit approval for use on the vending machine. The computer server determines the credit availability of the transmitted request and generates a transaction record from the transmitted request and transmits a response from the computer server to the personal communication device authorizing a predetermined credit for use on the vending device when such credit is authorized. The personal communication device then communicates the credit approval to the vending device to activate the vending device for dispensing the product or service. This eliminates the need for currency or of a dedicated connection between a vending device and a computer server to activate the vending device.

The present system for establishing credit on a vending device by a consumer uses the consumer's cellular phone or wireless communication device and a vending device's universal wireless interface coupled to the vending device controller. The wireless communication device has a local transceiver and a vending applet thereon for communication between the personal wireless communication device and the vending device universal wireless interface. A remote computer server is linkable with the personal wireless communication device for receiving requests from the personal communication device for credit for use on the vending device. The remote server is adapted to respond to credit approval for a vending device and for instituting the creation of a transaction record from the request.

A system and method is provided for establishing credit on an automatic vending device by means of a software Applet running on a consumer's cellular telephone and a vending universal wireless interface (VUWI) attached to the vending device. If the consumer does not have the Applet on their cellular phone, they can request a copy by dialing a specified telephone number which connects the consumer's cellular telephone to a server which is able to download the Applet to the consumer's cellular telephone. If the vending device does not have the VUWI attached, then communication between the consumer's cellular telephone and the vending device is not possible.

If the vending device has the VUWI and if the consumer has the Applet and wishes to establish credit on a vending device the consumer activates the Applet on their cellular telephone and the Applet establishes contact with the vending device through the VUWI in order to secure its identity and the prices levels of items available from the vending device. The Applet then requests that the consumer enter on the keyboard of the cellular telephone the amount to be spent as well as a personal identification number (PIN), which the Applet forwards to a server for approval. The server recognizes the request for approval and verifies that the requesting Applet has the correct cellular telephone identification and the correct consumer PIN. The server then checks the consumer's credit account for available funds. The server then creates a transaction record for its history log and communicates an approved or denied code to the Applet on the consumer's cellular telephone. The Applet stores a receipt on the consumer's cellular telephone and displays the approved or denied status of the request on the consumer's cellular telephone's display screen. If the request is approved the Applet communicates the amount to be spent to the vending device through the VUWI. The consumer then manually completes the acquisition from the vending device.

BRIEF DESCRIPTION OF THE DRAWINGS

Other objects, features and advantages of the present invention will be apparent from the written description and the drawings in which.

DETAILED DESCRIPTION OF THE EXEMPLARY EMBODIMENTS

Figure 1:
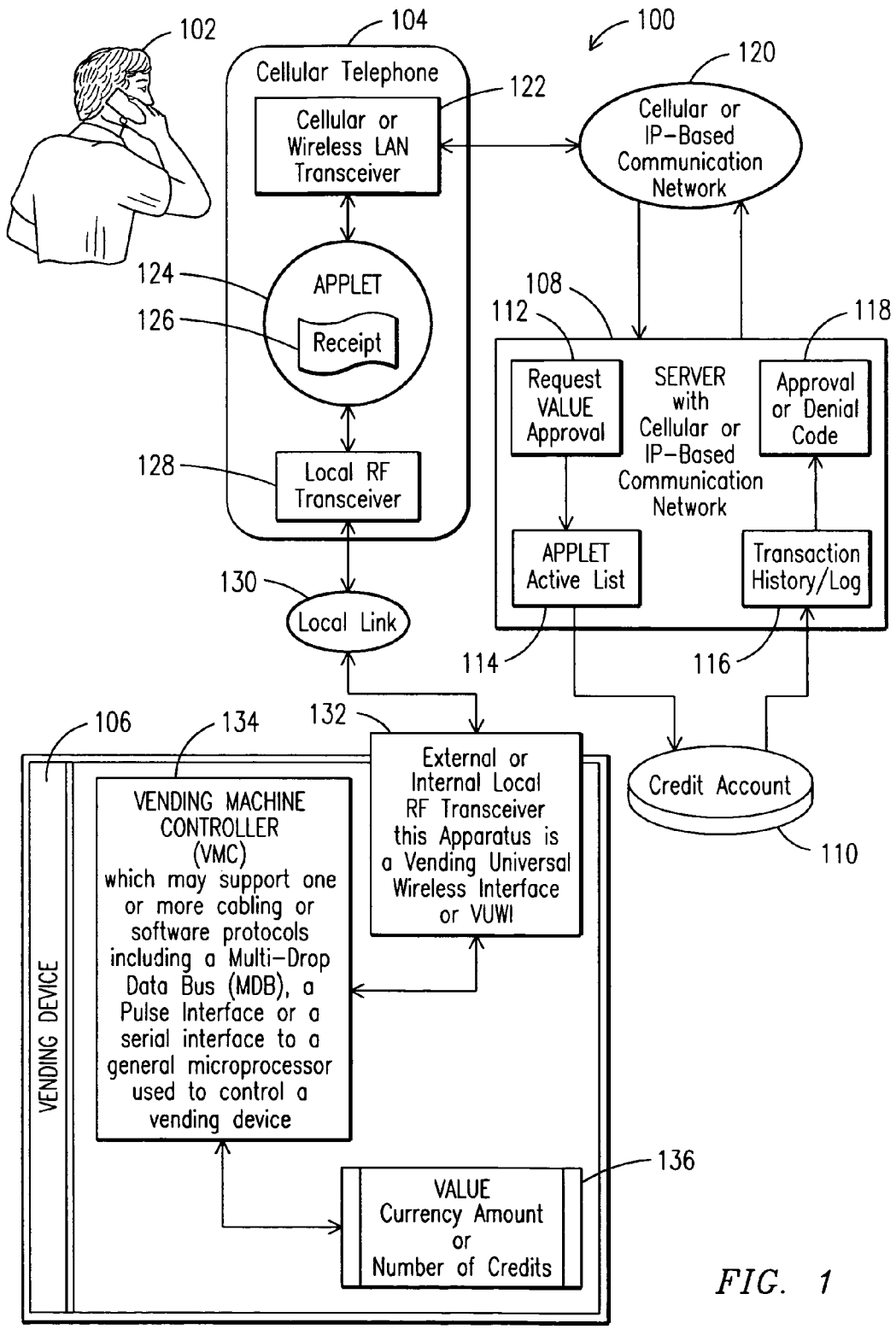
FIG. 1 is a diagram of the present system for establishing currency amount or a number of credits on a vending device using a cellular telephone.

An exemplary embodiment of the present invention will hereinafter be described with reference to the drawings, in which like numerals indicate like elements throughout the drawing figures.

The present invention is a method and system for establishing a currency value or credits on a vending machine or vending device, which includes copiers; facsimile machines; printers; data ports; laptop print stations; laundry machines; drink, snack, health food and candy vending machines; DVD and other movie media rental machines; cart rentals; personal service access time rentals as in massage tables, massage beds, foot massagers; access time on air/vacuum dispensing machines; access time on pay-per-play games or per game rental on pay-per-play games, hereinafter collectively called "vending device" by using the consumer's cellular telephone equipped with Bluetooth, Wi-Fi, wireless LAN or other RF communication capabilities, which cellular telephone may be in the form of a cellular telephone, a personal digital assistant (PDA), IPOD, IPHONE, Smartphone, Laptop computer or other similar personal wireless communication device any of which must be equipped with Bluetooth, Wi-Fi, wireless LAN or other RF communication capabilities, hereinafter collectively called "cellular telephone", as a link between the consumer, the vending device and a server supported credit account. The server is a general purpose digital computer system capable of receiving input from and providing output to a cellular or IP-Based communication network and may be operated by the consumer's telephone company, by the consumer's bank, by the consumer's credit or debit card issuer, by a retail outlet offering credit and/or gift and/or loyalty accounts to the consumer, by a merchant bank or gateway service provider offering credit and/or debit card processing services on behalf of the consumer's telephone company, the consumer's bank, the consumer's credit or debit card issuer, or a retail outlet offering credit and/or gift and/or loyalty accounts to the consumer hereinafter collectively called "server". The server supported credit account may be an account held by the consumer with the consumer's telephone company; with the consumer's bank, with the consumer's credit or debit card issuer; with a retail outlet offering credit and/or gift and/or loyalty accounts to the consumer hereinafter collectively called "credit account". In addition, the credit account can be a mobile wallet supported on the consumer's cellular telephone.

FIG. 1 shows the system 100 of the present invention. System 100 is configured to allow a consumer 102 to load a currency amount or a number of credits 136 to a vending device 106. For the purposes of this invention, the term "value" means either currency amount or number of credits available to the consumer 102 through the vending device 106. System 100 has a vending device 106 having an external or internal Bluetooth, Wi-Fi, wireless LAN or other RF transceiver, hereinafter collectively referenced as a Vending Universal Wireless Interface (VUWI) 132, a cellular telephone 104 associated with a consumer 102 which has a local RF Transceiver 128 and a cellular or wireless LAN transceiver 122, and a remote server 108.

The consumer's cellular telephone 104 is connected to the vending device 106 via the cellular telephone's local RF transmitter 128, local communication link 130, which is a short range RF communication link, and the vending devices VUWI 132. The consumer's cellular telephone 104 is also connected to the server 108 via the cellular telephone's cellular or wireless LAN transceiver 122 and the cellular or IP-based communication network 120. The cellular or IP-based communication network 120 allows the consumer 102 to use their cellular telephone 104 to establish a connection with server 108.

As a consumer 102 approaches a vending device 106 three possibilities exist. First, the vending device 106 does not have the ability to accept a currency amount or number of credits from a cellular telephone 104 and there is no action possible in connection with this invention. Second, the vending device 106 can accept currency amount or number of credits from a cellular telephone 104 but the consumer 102 does not have the required Applet 124 on their cellular telephone 104. If the consumer 102 decides to download the Applet 124 he follows the following procedure. The consumer 102 calls the telephone number displayed on the vending device 106 in order to connect to the server 108. Once the consumer dials the number displayed on the vending device 106 and the call is received by the server 108, the server 108 makes an automated verbal request through the consumer's cellular telephone 104 for confirmation from the consumer that they wish to download an Applet 124 to be used for making cashless purchases on vending device 106. The consumer can respond by pressing a particular key or keys on the keyboard of the cellular telephone 104 or by answering "Yes" verbally over the cellular telephone 104. If the correct key or keys are pressed or the verbal response of "Yes" is provided the server 108, the server downloads the Applet 124 and verbally tells the consumer to follow the activation directions on the display screen of the cellular telephone 104 that will be provided by the Applet 124. Once activated, the consumer 102 can use the Applet 124 for making cashless purchases on the vending device 106. If the correct key or keys are not pressed or the verbal response of "Yes" is not provided, the server 108 hangs up ending the call.

Third, the vending device 106 can accept a currency amount or number of credits from a cellular telephone 104 and the consumer 102 has the required Applet 124 on their cellular telephone 104. If the consumer 102 decides to make a cashless purchase from the vending device 106, the consumer follows the following procedure. The consumer 102 activates the Applet 124 on their cellular telephone 104. The Applet 124 using the cellular telephone's local RF Transceiver 128 connects to the vending device's VUWI, 132 establishing a two-way communication link 130 between the cellular telephone 104 and the vending device 106. The Applet 124 acquires from the vending device's controller 134 the vending device 106 identification information and a list of the price or prices of products or services or access time offered by the vending device 106 and transfers this information to the cellular telephone 104 and displays the price or prices on the cellular telephone's display screen. The consumer decides the total value 136 they are willing to spend on the vending device 106 and following the instructions provided by the Applet 124 on the cellular telephone's display screen. Then, using the cellular telephone's keyboard, the consumer enters the total value 136 to be spent along with vending machine identification information, which may be requested by the Applet 124, along with the Personal Identification Number or PIN number. Upon entry of the value 136 to be spent, the Applet 124, using the cellular telephone's 104 cellular or wireless LAN transceiver 122, establishes a two-way communications link using the cellular or IP-based communication network 120 with the server 108. The server 108 uses the two-way communication link to established via the cellular or IP-based communication network 120 data from the Applet 124 along with the identification information of the cellular telephone 104 and the identification information of the vending device 106 and the total value 136 requested by the consumer 102 in approving the credit for the vending device 106. The server 108 processes the request for approval 112 of the value 136 requested by the consumer 102 by referencing the consumer 102 server supported credit account 110, which it controls, either directly or indirectly. Once the server 108 has checked for the availability of total value 136 on the consumer's credit account 110, the server 108 generates an approval or denial code 118 and further creates a transaction record 116 as a history or log of the activity. This includes the details about the request including the cellular telephone 104 identification information and the consumer's confirmation or identification information such as a personal identification number (PIN), the vending device's 106 identification information, the total value 136 to be authorized, the time and date of the request and finally the approval or denial code.

The approval or denial code 118 is communicated to the consumer 102 via the cellular or IP-based communication network 120 and the consumer's cellular telephone 104. The total value 136 approved for use on the vending device 106 is in turn transmitted to the vending device 106 via the cellular telephone's 104 local transmitter 128 using the local link 130 which is received by the vending device's 106 VUWI 132 which in turn informs the vending device's 106 vending device controller 134 of the total value 136 the consumer 102 has available for making a purchase. The vending device's controller 134 receives the total value 136 and informs the consumer 102 that they have been approved to make a purchase. The vending device 106 provides information to the consumer 102 about the total value 136 (ie. currency amount or number of credits) by whatever means the vending device 106 normally uses to inform the consumer 102 to proceed with a purchase after accepting coins, paper currency, credit cards, or debit cards. This system does not require a dedicated communication link between the vending device and the server that authorizes the vending device to dispense the requested product.

Figure 2A:
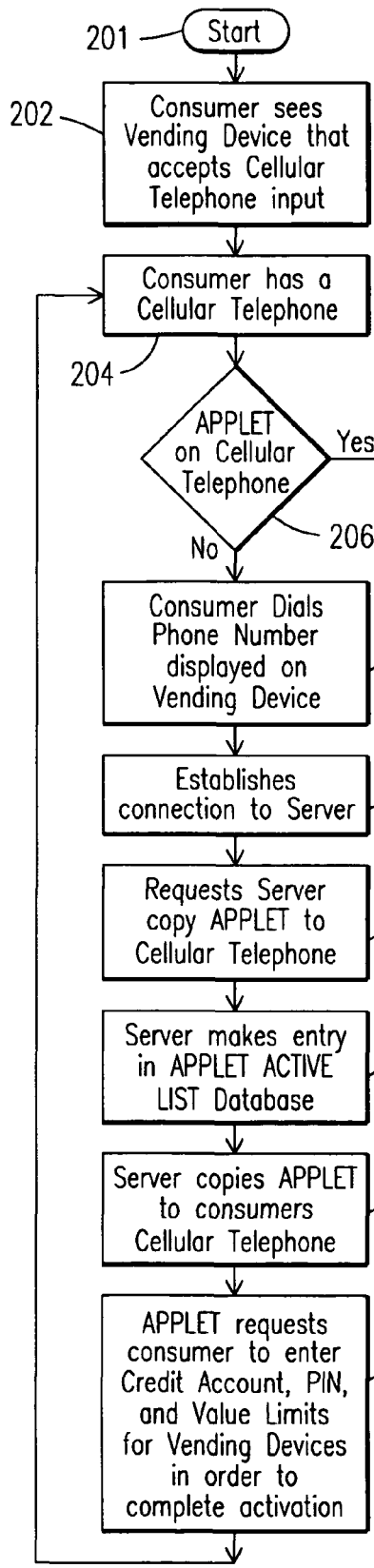
FIG. 2 is a flow chart of the present method of establishing a currency amount or a number of credits on a vending device using a cellular telephone.
Figure 2A:
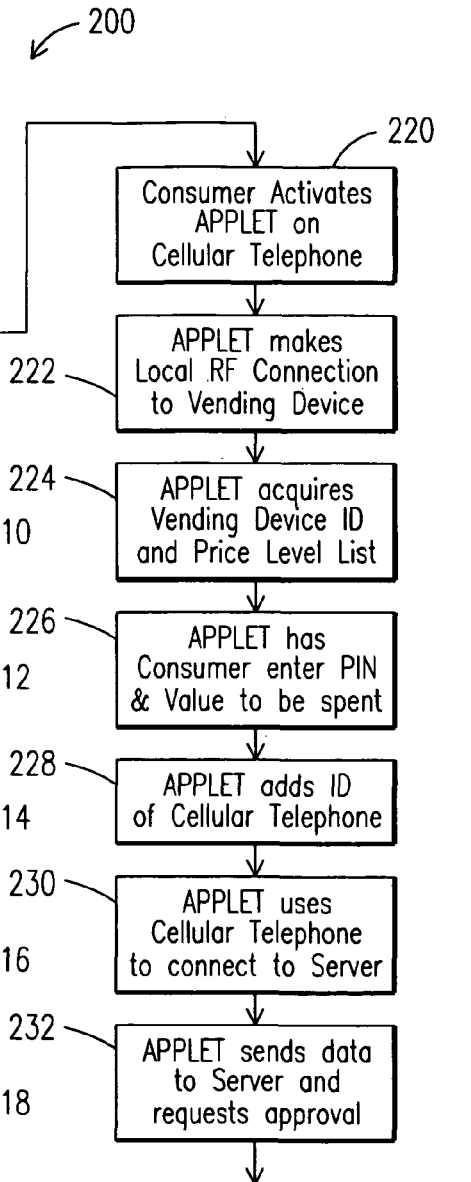
Figure 2B:
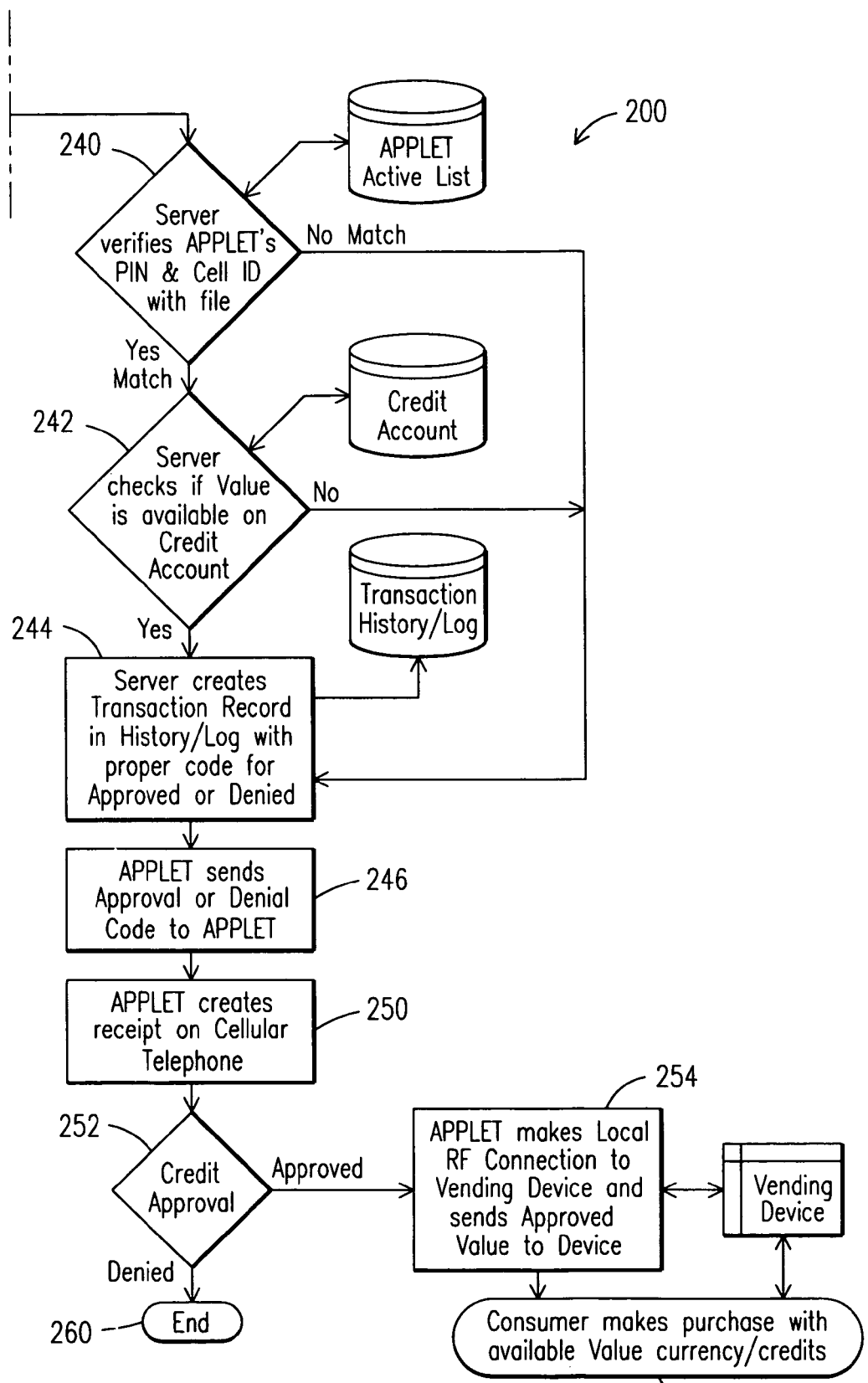

Turning to FIG. 2, a method 200 allows the consumer 102 to establish credit or value 136 on an automatic vending device 106 by using their cellular telephone 104. Using the established credit or value 136, the consumer 102 is able to acquire a product, service, or access time from the vending device 106. The method 200 begins at step 201 and proceeds to step 202 when the consumer sees a vending device that accepts a cellular telephone input. At step 202, the consumer 102 sees the vending device 106 that accepts a cellular telephone 104 input of credits or value 136 in which the consumer 102 wishes to acquire a product, service, or time access to the vending device 106. Information displayed on or adjacent to the vending device 106, enables the consumer 102 to ascertain the price of the product, service or access time offered by the vending device 106. In addition, instructions for using the consumer's cellular telephone 104 to establish credit on the vending device 106 are displayed on or adjacent to the vending device 106.

The instructions include a telephone number to call for downloading of the Applet 124 that will run on the consumer's cellular telephone 104 and allow the consumer 102 to establish credit or value 136 on the vending device 106.

If the consumer 102 already has the Applet 124 on their cellular telephone 104, the method proceeds to step 220 to activate the Applet on their cell phone. Otherwise at step 210, the consumer 102 dials the number displayed on the vending device to make a telephone connection between the cellular telephone 104 and the server 108 via cellular or IP-based communication network 120. A connection is made with the server 108 at step 212 over the cellular or IP-Based communication network 120. The consumer 102 requests, in step 214, that the server 108 download the Applet 124 to their cellular telephone 104. The server 108 in step 214 makes an entry into its Applet active list 114 and the server 108 in step 218 downloads the Applet 124 to the consumer's cellular telephone 104 and instructs the consumer to follow the instructions displayed on their cellular telephone. The Applet in step 219 asks the consumer 102 to input a credit account number, its expiration date and its card verification value (CVV) code, which credit account will be used when acquiring products, services or access time from vending devices 106. The Applet 124 also requests entry of dollar limits to be associated with various types of vending devices 106 and a personal identification number (PIN) to be used when using the Applet 124 to acquire products, services or access time from vending Devices 106. Once the Applet 124 requests have been answered and entered by the consumer 102 on the cellular telephone's keyboard, the Applet 124 contacts the server 108 and uploads the information to the server 108 to store in the Applet active list 114. All of the information entered to the Applet 124 is cleared from and not stored on the cellular telephone 104. If the consumer 102 has the Applet on their cellular telephone 104 the consumer 102 moves to step 220 to activate the Applet 124.

If the Applet 124 is on the consumer's cellular telephone 104, the consumer 102 in step 220 activates the Applet 124 on the cellular telephone in step 220. The Applet 124 then institutes a search of the cellular telephone's local RF transceiver 128 to find the local link 130 to the vending device 106 equipped with a VUWI 132 and establishes a connection thereto. Once the connection is established between the Applet 124 and the vending device 106 in step 224, the Applet 124 acquires the vending device's identification information and the number of differently priced products, services or access time periods that are available on the vending device 106. The Applet 124 then displays this information to the consumer 102 on the cellular telephone's 104 display screen and requests in step 226 that the consumer 102 enter their personal identification number (PIN) and select the value 136 that the consumer wishes to have authorized for input to the vending device 106. The Applet 124 in step 228 adds the ID of the cellular telephone 104 and continues in step 230 using the cellular telephone's 104 cellular or wireless LAN transceiver 122 to make a connection through the cellular or IP-based communication network 120 with the server 108. Once the connection is established in step 230, the Applet 124 in step 232 transfers the consumer's personal identification number (PIN) and the cellular telephone's identification information along with the value 136 requested by the consumer 102 to the server 108 and requests approval for the transaction. The server 108 in step 240 checks to make sure the Applet 124 making the request is coming from the consumer 102 and cellular telephone 104 that the server 108 currently associates with the Applet 124.

The Applet 124, as referenced herein, is a software program designed to be executed or to run on a consumer's personal communication device 104 and is capable of communicating with the VUWI 132, as defined herein, via Bluetooth or WiFi RF protocols. The Applet displays information to the consumer about possible amounts to be spent on the vending device 106 and intakes responses from the consumer's personal communication device 104 display screen and keyboard. The Applet 124 is also capable of using the consumer's personal communication device 106 internet connection to communicate long distance with the central server 108 which provides accessed to the credit account, as defined herein, belonging to the consumer. The Applet 124 is capable of supporting this three-way interface between the vending device 106 equipped with a VUWI 132, the consumer's personal communication device 106 and the central server 108 in order to accomplish the task of establishing credit on the vending device 106. This three way interface uses encrypted data streams. Once the vending device 106 has been notified by the Applet 124 of the total value authorized for purchases, the vending device 106 then notifies the consumer 102, by whatever means the vending device 106 normally uses to inform the consumer, that the consumer 102 may proceed with a purchase as if the consumer had actually inputted coins, paper currency, credit or debit card directly into the vending device 106.

The server 108 compares the transmitted consumer identification number (PIN) and the cellular telephone's identification information with the data it has stored on its Applet active list 114. If the information matches the server 108, it continues with step 242 to check if the value is available on the consumer's credit account. The server 108 checks in step 242 to see if the value 136 requested by the consumer 102 is available on the consumer's credit account 110. The server 108 then continues with step 244 where it creates a transaction record to be placed in the transaction history/log 116. Based on the results of the two tests it made in steps 240 and 242, the server also attaches an Approved or Denied code to the transaction record. The server 108 in step 246 sends an approval or denial code to the Applet 124. The Applet 124 in step 250 creates a receipt for reference by the consumer 102 on the consumer's cellular telephone 104. The Applet 124 in step 252 checks the Approved or Denied Code sent by the server 108 and if the transaction was denied the Applet 124 displays a request denied message to the consumer 102 on the consumer's cellular telephone's 104 display screen and the transaction is ended. If the transaction was Approved, the Applet 124 in step 254 establishes contact with the vending device 106 using the cellular telephone's local RF transceiver 128 through the local link 130 to establish a connection to the vending device 106 through its VUWI 132 and communicates the value 136 approved to the VUWI 132 which in turn sends the value 136 to the vending device's controller 134. The vending device 106 through its controller 134 notifies the consumer 102 that they may continue with a purchase from the vending device 106 and the consumer 102 completes their purchase from the vending device 106 as if they had entered actual currency to the vending device 106.

Figure 3:
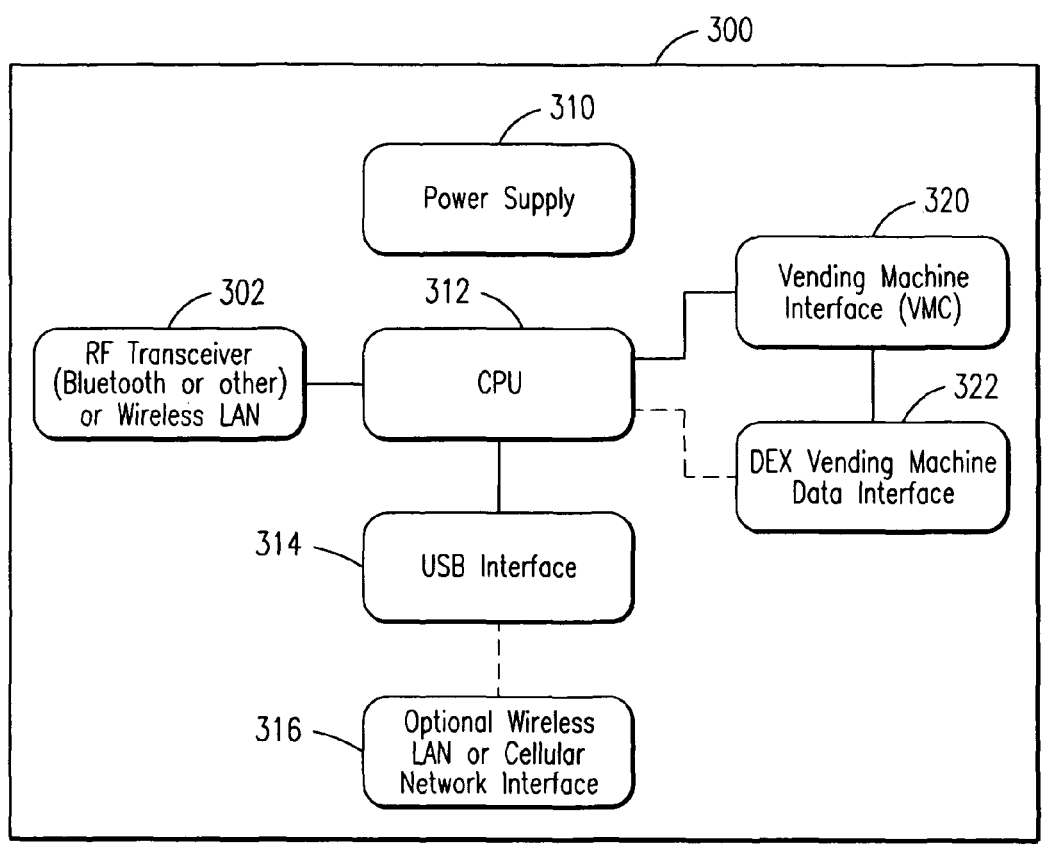
FIG. 3 is a block diagram of the vending Universal Wireless Interface (VUWI) that is incorporated into a vending device that allows the establishing of a currency amount or a number of credits on the vending device using a cellular telephone.

The credit account 110 used herein and supported by the server 108 may be an account held by the consumer with the consumer's telephone company, with the consumer's bank, with the consumer's credit or debit card issuer, with a retail outlet offering credit and/or gift and/or loyalty accounts to the consumer or be credit held as part of a mobile wallet on the consumer's cellular telephone. FIG. 3 is a block diagram of the vending universal wireless interface (VUWI) 300 of the present invention. The VUWI 300 is designed to allow a consumer's cellular telephone 104 to communicate locally with a vending device 106. The VUWI 300, also referenced as VUWI 132 in the system 100, provides an interface between the cellular telephone 104 and the vending device's 106 vending machine controller 134 to transfer value 136.

The VUWI 300 consists of several subsections controlled by the CPU 312. The transceiver 302 provides the local link 130 to the cellular telephone 104 for customer interface and optionally WAN access 120 to the server 108. The power supply 310 modifies the power supplied by the vending device 106 to the type required by the various components of the VUWI 300. A USB Interface 314 allows the plug-in and removal optional WAN to access devices such as Optional. WAN Link 316 to provide direct reporting of VUWI 300 status. The Vending Machine Interface (VMC) 320 enables the CPU 312 to transfer the value 136 to the controller 134. The DEX vending machine data interface 322 provides optional data collection of vending device 106 status.

Normal operation of vending universal wireless interface (VUWI) 300 is as follows. The vending device 106 provides power to the Power Supply 310 that in turn will provide power to all other components of the VUWI 300. The CPU 312 will initialize the transceiver 302, USB interface 314, vending machine interface 320 and any optional interfaces attached such as optional WAN link 316 and the DEX vending machine data interface 322. The CPU 312 sets the transceiver 302 to make it available to establish connections to cellular telephone 104. A customer 102 establishes a connection with transceiver 302 through a cellular telephone 104 by activating the Applet 124. The CPU 312 provides a list of prices, machine identification information to the Applet 124 running on the cellular telephone 104 over the transceiver 302 and the local link 130. Optionally the CPU 312 can also provide data collected by DEX vending machine data interface 322 to the Applet 124 running on the cellular telephone 104 by transceiver 302 and the local link 130. The Applet 124 requests on the cellular telephone's display screen that the consumer enter value 136 to be spent on the vending device 106 using the cellular telephone's 104 keyboard. The Applet 124 then sends a request for approval along with all other data details to the server 108 for authorization over the cellular telephone's 104 cellular or wireless LAN transceiver 122 over the cellular or IP-based communications network 120. The server 108 then processes the request and responds to the Applet 124 running on the cellular telephone 104. If the Applet 124 detects that the request was approved it will communicate the approved value 136 to the vending device 106 over the cellular telephone's local RF transceiver 128 through the local link 130 to the vending device's transceiver 302, which will in turn transfer the value 136 to the CPU 312. The CPU 312 transfers the value 136 to the vending machine controller 134 using the vending machine interface 320. The vending device controller 134 will then handle the purchase by the consumer 102 as if the consumer 102 had actually entered currency or a credit card to the vending device 106.

The system 100 and method 200 using the VUWI 300 of the present invention allows the consumer 102 to establish a currency amount or number of credits on a vending device 106 in order to acquire products, services or access time periods from a vending device 106 without using currency or a credit card but by only using a cellular telephone 104 which through the VUWI 300 is able to communicate with the vending device 106. Thus, the system 100 and method 200 using the VUWI 300 of the present invention eliminates the need for in pocket currency or for a dedicated communication link between the vending device 106 and a credit account 110.

It should be clear at this time that the present invention eliminates the need for currency for a vending machine or device and also eliminates the need for a dedicated on-line or dial up connection between the vending device and a server supported credit account by using a consumer's personal communication device equipped with RF communication capability. However the present invention is not to be construed as limited to the forms shown which are to be considered illustrative rather than restrictive.

We claim:

1. A method of establishing credit on a vending device by a consumer comprising:
   coupling a vending universal wireless interface to a vending device controller;
   activating an applet on a personal wireless communication device to establish a wireless link with said vending device controller;
   communicating between said personal wireless communication device and said vending device to acquire the vending device's identification number and vending information;
   establishing a wireless link between said personal wireless communication device and a remote computer server;
   transmitting information acquired from said vending device from said personal wireless communication device to said remote computer server along with a request for credit approval for use on said vending device;
   determining credit availability for said transmitted request through said remote computer server;
   generating a transaction record from the transmitted request;
   transmitting a response from said remote computer server to said personal communication device authorizing a predetermined credit for use on said vending device when such credit is authorized;
   transmitting said credit approval from said personal wireless communication device to said vending device; and
   activating said vending device to dispense a product therefrom;
   thereby eliminating the need for currency or the surrendering one's credit card for swiping by a third party, or of a dedicated connection between a vending device and a remote computer server to activate a vending device is eliminated.

2. The method of establishing credit on a vending device by a consumer in accordance with claim 1 including the step of downloading the applet on a users personal wireless communication device prior to activating said applet.

3. The method of establishing credit on a vending device by a consumer in accordance with claim 2 including the step of acquiring price information from said vending machine by said personal wireless communication device for transmission to said remote computer server.

4. The method of establishing credit on a vending device by a consumer in accordance with claim 3 including the step of acquiring the users cellular telephone identification by said applet for transmission to said remote computer server.

5. The method of establishing credit on a vending device by a consumer in accordance with claim 4 including the step of dialing a telephone number on said vending device for downloading said applet.

6. The method of establishing credit on a vending device by a consumer in accordance with claim 5 including the step of entering the currency amount to be spent onto said personal wireless communication device.

7. The method of establishing credit on a vending device by a consumer in accordance with claim 6 including the step of said remote server verifying said personal wireless communication device identification and personal identification information upon receipt of a request from said personal wireless communication device.

8. The method of establishing credit on a vending device by a consumer in accordance with claim 7 including the step of said remote computer server generates an approval or denial response to personal wireless communication device.

9. A system for establishing credit on a vending device by a consumer using the consumer's personal wireless communication device comprising:
- a vending device having a vending universal wireless interface coupled to said vending machine device controller;
- a personal wireless communication device having a local transceiver and having a vending applet thereon for communication between said personal wireless communication device and said vending device universal wireless interface; and
- a remote computer server linkable with said personal wireless communication device for receiving requests from said personal wireless communication device for credit for use on said vending device, said remote computer server being adapted to respond to credit approval for a vending device and for instituting the creation of a transaction record from said request.

10. The system for establishing credit on a vending device by a consumer using the consumer's personal wireless communication device in accordance with claim 9 in which said personal communication device is a cellular telephone.

11. The system for establishing credit on a vending device by a consumer using the consumer's personal wireless communication device in accordance with claim 10 in which said vending universal wireless interface includes an RF transceiver.

12. The system for establishing credit on a vending device by a consumer using the consumer's personal wireless communication device in accordance with claim 11 in which personal wireless communication device vending applet includes means for setting up a communication link with said vending universal wireless Interface and acquiring vending device identification information therefrom.

13. The system for establishing credit on a vending device by a consumer using the consumer's personal wireless communication device in accordance with claim 12 in which said vending device is a vending machine for vending product therefrom.

* * * * *